United States Patent Office 2,909,077
Patented Oct. 20, 1959

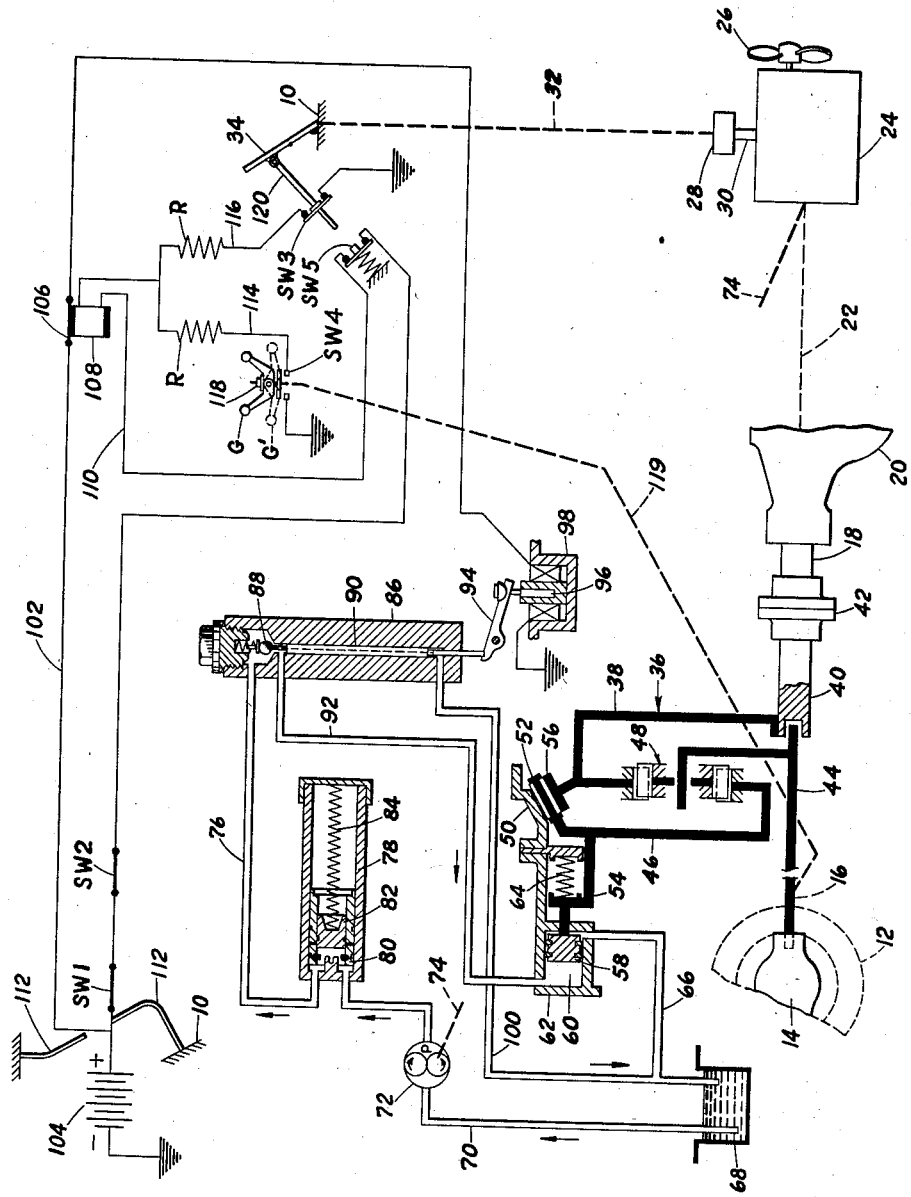

2,909,077

TRANSMISSION CONTROL SYSTEM

Milton Kamins, South Bend, Ind., assignor to Studebaker-Packard Corporation, Detroit, Mich., a corporation of Michigan Application August 1, 1955, Serial No. 525,659

6 Claims. (Cl. 74—472)

The present application relates to a control system for a two-way direct driving transmission which also offers a modified two-way drive therethrough, and more particularly relates to a transmission control for effectively producing a normal drive and additionally an overdrive, or else an underdrive and a normal drive depending on the more readily understandable way of expressing the relationship which in either case involves a direct drive plus the other drive, however it may be expressed.

A dual speed transmission drive is a convenience largely afforded as a fuel economy measure in the automotive field and the dual speed aspect of this measure is principally confined to a set of planetary gearing as a source which is a mere adjunct to a main forward and reversely driving automotive transmission, usually being attached to the latter at the rear or tail shaft end thereof. The lower ratioed and slower one of the dual speeds is relied upon principally for city traffic driving and for hill climbing where passby acceleration and good pickup are desired, whereas the higher ratio and faster of the dual speeds is employed in the open country and under other cruising conditions during which economy rather than pickup is at a premium.

One or more forms of commercially available so-called overdriving devices answering to the purpose of the preceding paragraph are presently offered as optional accessory equipment on several current makes of domestic automotive vehicles and a common commercial form of the overdrive is accelerator pedal controlled and powered by an ignition interrupting type driving engine under control of the same accelerator pedal. Such an overdrive commonly incorporates planetary gearing having a sun gear reaction member, further having a retractable braking pawl which may be advanced to engage and hold the reaction member against rotation for providing upshift or overdrive, also having a one-way clutch causing all members in the planetary gearing including the reaction member to rotate together when kickdown (downshift) occurs as the result of the pawl being withdrawn, and further having a dash mounted driver controlled Bowden pull wire to lock-out the overdrive by means of a sun gear engaging shiftable jaw brake. A first disadvantage characterizes the transition into the condition of upshift just referred to, in that a first time delay necessarily attended by retraction by the accelerator pedal is required in order to produce a torque reversal and synchronization in the gearing in order for the pawl to be advanced to a point where it can engage and hold the sun gear. A second disadvantage characterizing the transition into the condition of kickdown, just referred to, is that a second time delay attended by ignition interruption is necessary to produce a torque reversal in the gearing in order for the pawl to be withdrawn to a point where it disengages the sun gear. A third disadvantage characterizing the overdrive operation subsequent to kickdown is that the one-way clutch permits the planetary gearing to free-wheel thus negativing any prospect of engine braking as with a positive two-way drive with which overrun is impossible. A fourth disadvantage characterizing the Bowden wire lock-out control for the overdrive is that sometimes the jaw brake shiftable thereby, is blocked from readily engaging the sun gear and the transmission and road wheels must be forcibly rotated slightly in order to permit the jaw brake to have a free path of travel for engaging the sun gear; in any case the operation of such shiftable member by means of a Bowden pull wire may tend to become balky or require exertion and effort on the part of the operator to a degree not particularly desirable.

An object specifically for the present invention is the overcoming of four or more foregoing disadvantages in the provision of a two-way drive device affording a positive two-way modified drive therethrough and being controlled in drive shift in a manner whereby the first and second delays are substantially reduced or else eliminated and whereby the lock-out is accomplished by means of a simple flip switching operation rather than by the manual tugging at a Bowden cable. In the present illustrative embodiment of the invention a planetary gear set is used in conjunction with a shiftable double faced cone clutch permitting power shifting of the same, that is, a shift under power. According to one feature, the power up-shift and the power down-shift of the clutch and gear set are accomplished through the use of automatic controls preventative of jerky or inopportune lurching shifts which may otherwise tend to occur under certain conditions, for instance under the condition of deceleration.

Another object is to provide automatic circuit controls for a power shifting drive device as defined in the preceding object wherein electrical type circuits are used at least in part among the control circuits, particularly in the lock-out circuit for the device and wherein a simple flip switch may be employed in the lock-out circuit for conveniently disabling the shift mechanism with a simple unresisted motion of the hand.

A further object of the invention is the provision of a power shifted change speed device for automobiles having a power control element and a governor element therein, in which the device has automatic controls for shifting the same for attaining higher speed as a joint function of the power control and governor elements, in which the higher speed is maintained as an individual function of either of the power control or governor elements, and in which again as a proper joint function of these two elements a shift may be made to lower speed. According to a feature of the invention, a switch connected to the governor operates one of a pair of branch circuits through which current for controlling up-shift is carried and the other branch circuit is operated by a switch connected to the power control element. Opening of both switches causes de-energization whereupon down-shift occurs. The two-named switches are connected in electrically parallel branches and act to control an electromagnetic relay which in turn controls the shift mechanism for the device, preferably hydraulic shift mechanism therefor.

Another object of the invention is the provision of a plurality of switch controlled branch circuits for operating a wound electromagnetic relay in which at least two of the branch circuits are employed of a character no one of which is of sufficient capacity to operate the relay, and either of which is of sufficient capacity to maintain energization of the relay with proper strength in the winding or windings thereof following initial operation of the relay, and finally both are necessary to produce such initial energizing operation of the relay. The noted relay may have more than one winding as previously stated but according to the illustrative example of the invention to follow, the relay has only one winding connected to two resistance containing type branch circuits, High current flow, of which neither branch is capable of conducting with the inclusion of the resistance with which it is burdened, is necessary to initially energize the winding to a tripping strength for the relay, but thereafter only a minor portion of the high current flow is necessary to hold the relay and it is noteworthy that the resistance containing branches are each one capable of carrying such minor current flow.

Within the more specific objects of the invention, the just noted principle of the high tripping current and low holding current for a relay is advantageously employed in that a governor switch controls one resistance containing relay branch circuit and a power control switch controls the other such that a joint effort of the controls must be made in order to actuate the relay initially.

Another object of the invention is to provide a set of governor actuated and throttle actuated automatic controls for a down shiftable vehicle two-way drive which on closed throttle retarded coasting of the vehicle brings into effect a governor down-shift control which is so modified by a closed throttle circuit as to delay any lurch causing engagement into the down shifted speed two-way drive until at least after the vehicle retardedly coasts to a point at which the throttle will again be actuated, preferably at a point at which a full-stop is reached.

Further features, objects and advantages will either be specifically pointed out or become apparent when for a better understanding of the invention reference is made to the following written description taken in conjunction with the accompanying drawing in which the single figure shows a schematic representation of the invention applied to an automotive vehicle.

In the drawing, an automotive vehicle is fragmentarily shown having a passenger compartment 10 variously indicated at points about the body thereof and being adapted to be suspended on a plurality of wheels of which one of a laterally spaced apart pair of rear traction wheels is indicated at 12. The wheel 12 is connected to a differential 14 of conventional type common to the rear pair of traction wheels and receives torque from a driven propeller shaft 16. The shaft 16 is connected to a driving source comprising an output or tail shaft 18 of a forward and reversely driving transmission 20 having an engine driven driving shaft 22 which is powered by an automotive type engine 24. The engine 24 has an air circulating and cooling fan 26 in the upper portion of the forward end thereof and includes a down draft type carburetor 28 communicating with the engine through a downwardly directed manifold induction conduit 30. The engine carburetor 28 is driver controlled through a connection at 32 by means of a heel pivoted accelerator pedal 34 mounted in the passenger compartment 10 to swing through a normal range of movement from a fully released upper position to normally depressed wide-open throttle position, and having provision for an additional amount of kick-down overtravel beyond the normally depressed wide-open throttle position.

Means may be provided for connecting together the transmission tail shaft 18 and the driven shaft 16 in dual speed two-way positive drive.

Illustrative of one example of dual speed two-way positive drive means is a planetary gear train 36. The gear train 36 includes a ring gear structure 38 which is fast to a stub shaft 40 coupled at 42 to the transmission tail shaft 18. Further included in the gear train 36 are a planet carrier member 44 fast to the driven shaft 16, a shiftable reaction sun gear member 46, and a set of pinion members 48 preferably three or more in number which are carried by the carrier 44 and which mutually interdentally engage the sun and the ring gear members 46, 38 in orbiting meshed engagement. The shiftable reaction sun gear member 46 is rotatably mounted in a case 50 for the gear train 36 and has a pair of mutually angled apart flanges 52 and 54 fast thereto. The one flange 52 forms a double friction faced frusto conical wear member, the outer face of which is frictionally engageable with a companion frusto conical brake surface adjacent thereto in the case 50 and the inner surface of which is frictionally engageable with a companion frusto conical clutch surface 56 formed on the ring gear member 38.

The shiftable sun gear structure 46 of the present disclosure is axially and rotatably movable within the case 50 so as to selectively engage the brake surface of the latter to be held stationary in one shifted position or to engage the ring gear clutch face 56 and rotate therewith in another position and for this purpose of shifting, the flange 54 carried by the sun gear 46 is connected to an annular pressure movable piston 58 which is axially slidable in a toroidal chamber 60 within an annular hydraulic cylinder 62. A return spring 64 anchored to the case 50 engages the flange 54 to serve to bias the sun gear stationarily against the case 50. A drain line 66 is connected to the cylinder 62 so as to drain off leaked fluid from the chamber 60 thereof into a hydraulic reservoir 68. A pump supply pipe 70 connects the reservoir 68 and the intake side of a pump 72 which is driven at engine speed through a connection to the engine schematically illustrated at 74. The pump 72 supplied fluid under pressure to a pump outlet conduit 76 in which a mechanical type pressure accumulator 78 may be interposed if desired. The accumulator 78 has a cylindrical case that includes a seal carrying sleeve 80 which is slidable therein and which slidably receives for limited relative axial movement a piston 82 which opens and closes a pair of transverse passages shown in the walls of the sleeve 80 for purposes of intermittently lubricating the seals carried by the latter. The accumulator 78 is air loaded or air and spring loaded by a means which may include a coil spring 84 that collapses as fluid accumulates in the accumulator case. The pump supplied conduit 76 is connected to a solenoid actuated plunger type valve case 86 at a location so as to communicate with a chamber therein in which a ball check valve element 88 is located. The ball check valve 88 is spring urged downwardly into its seated position from which it may be forcibly removed upwardly by means of an actuating plunger 90 which loosely slides in a vertical path in the valve case and which engages at its upper end the ball check valve element 88. Unseating of the ball check valve 88 by means of the actuating plunger 90 permits pump pressure from the pump supplied line 76 to enter a conduit 92 establishing communication between the valve 86 and the pressurizable chamber 60 in the cylinder 62 controlling the sun gear 46. The valve plunger 90 at its lower portion engages one end of an actuating lever 94 which is pivoted on a rock shaft at its mid-portion for rocking movement. The opposite end of the lever 94 is engaged by a movable armature element 96 in a solenoid 98 which when energized withdraws the armature 96 downwardly and causes the plunger 90 to move oppositely vertically upwardly to open the ball check valve and pressurize the piston chamber 60. The pressure movable piston 58 thereupon causes the sun gear member 46 to shift forwardly into clutched engagement with the ring gear clutch 56 and the ring gear 38 so as to lock up the gear train 36 for 1:1 drive between the transmission tail shaft 18 and the driven shaft 16 for the differential.

On the other hand, de-energization of the solenoid 98 is attended by action of the ball check valve element 88 in closing, by accompanying action of drainage of the pressure chamber 60 through a conduit 100 connected to the reservoir 68, and by appropriate shifting of the sun gear 46 under action of the return springs 64 into stationary braked engagement with the case 50 so as to provide an underdrive ratio from the ring gear 38 through the planet pinions 48 and to the carrier member 44 in relatively slow speed drive.

It will be appreciated that over a towed start whereby the engine 24 is started as a result of a push by the wheels 12, the pump 72 will be idle while the engine 24 is idle and that the return springs 64 will hold the sun gear 46 in its underdrive, case engaging position for conducting torque to the engine 24 to start the same.

Novel control means may be provided for connecting the solenoid 98 to a source of energy for energizing the same.

Illustrative of one example of solenoid energizing means is an electric circuit 102 disposed between the solenoid 98 and a battery 104 for the vehicle and having an interposed electromagnetic relay switch 106 which is single wound and controlled at 108. The single winding 108 of the electromagnetic relay switch 106 is a coil connected at one end to a conductor 110 in which a pair of series connected switches SW1 and SW2 is interposed between the winding 108 and the battery 104. The switches SW1 and SW2 are preferably mounted to an instrument panel 112 in the passenger compartment 10, the switch SW1 constituting a key controlled ignition switch for the engine 24 and the switch SW2 constituting a flip type direct drive lockout switch. The relay winding 108 is connected at another end to a pair of electrically parallel branches 114 and 116, each of which includes a resistor R of about the same resistance as the other resistor R. Further included in the branch 114 is a governor switch SW4 which is controlled by a governor G having a static or slow speed position shown by solid lines in the drawing and having a pre-determined faster speed position shown by the dotted lines G' in the drawing wherein a governor actuated shaft and collar element 118 shifts downwardly to close the switch SW4.

The governor G is sensitive to vehicle speed and motion, having a connection schematically indicated at 119 to the wheels 12 usually through a gear, not shown, fast to the shaft 16. A switch SW3 is included in the branch 116 and is actuated by an actuating member 120 connected to the accelerator pedal 34 and arranged to close the switch SW3 whenever the pedal 34 assumes its extreme upper fully released position. The actuator member or element 120 has an extremity which in the kickdown position of the pedal 34 beyond its normal range of throttle opening movement, engages and causes a spring closed switch SW5 to open which is included in series in the conductor 110 with the key controlled and governor cutout switches SW1 and SW2. The series switches SW1, SW2, SW5 each have the same effect on the conductor 110 and the control circuit.

As already noted, the planetary gear train 36 affords a dual speed two-way positive drive between the engine 24 and the traction wheels 12 of the vehicle. The direct drive of the train 36 effected when sun gear member 46 is clutched to the ring gear member 38 to lockup the members of the planetary train, affords the higher ratio drive from the engine to the wheels whereas the underdrive or slower speed ratio is used for normal vehicle drive in which economy is no particular item and in which the reaction sun gear 46 is braked and held stationary to provide a reduced speed ratio from the engine 24 to the traction wheels 12. The latter ratio or underdrive is automatically afforded whenever the key controlled ignition switch SW1 is open, whenever the direct drive cut out switch SW2 is open, or whenever the kickdown switch SW5 is held open due to overdrive position of kickdown being assumed by the accelerator pedal 34 when downmost.

The high range or direct drive in the train 36 obtains whenever the actuating solenoid 98 is in its energized state which in turn depends on when the single wound electromagnetic switch relay 108 is energized. Owing to the fact of the resistances R being located in the separate branches 114, 116 these branches are individually incapable of energizing to a point of actuation the single winding 108 of the relay, having to rely solely on the potential available from the battery 104, which may be six or twelve volts at most; together, however, the combined current carrying capacity of the branches 114, 116 is jointly enough to energize the relay winding 108 and close the electromagnetically controlled switch 106 thereof to establish high ratio drive in the gear train 36.

In operation of the vehicle, the switch SW5 is normally closed, and the other two series switches SW1 and SW2 are normally closed. The governor G closes the switch SW4 in the branch 114 at a predetermined speed preferably between or at 12 and 30 miles an hour and thereafter the vehicle operator or driver above such pre-determined speed momentarily releases the accelerator pedal 34 with his foot to close the switch SW3 and complete the branch circuit 116 to establish overdrive through the gear train 36. Each of the branches 114, 116 is sufficient thereafter of itself to hold the electromagnetic winding 108 energized sufficiently to keep the switch 106 closed according to an accepted principle whereby a relay drawing a high tripping current is effectively held thereafter merely by a low holding current. Accordingly, the accelerator pedal 34 may immediately, after release above the pre-determined speed setting of the governor, be restored by the driver to an operating position within its normal range of travel.

Down shifting from direct drive to underdrive can be accomplished, firstly, by depressing the accelerator pedal 34 to the over-travel position of kickdown causing the spring returned kickdown switch SW5 to open, secondly, by touching the accelerator pedal 34 after reaching a full closed throttle coast stop prior to which the governor G automatically opens at its predetermined cutout speed, thirdly, by interrupting the circuit by opening the key controlled ignition switch SW1, fourthly, by flipping open the manual cutout switch SW2 and, fifthly by holding apart throttle with the accelerator pedal 34 within its normal range of movement at a time at which the vehicle decelerates to drop below the predetermined cutout speed of the governor G.

It will be appreciated that during upshift into direct drive of the gear train 36, the release of the accelerator pedal 34 above governor cut-in speed is only momentary so as to close the switch in the branch 116 and that thereafter throttle operation may be resumed without waiting for the attendant torque reversal to effect the upshift as with conventional two way drives. The fact is to be recognized that kickdown into underdrive ratio is accomplished instantaneously with downward over-travel of the accelerator pedal beyond its normal range of movement so as to open the kickdown switch SW5 and no ignition interruption and other delay for torque reversals are necessary as with conventional two way drives. In spite of the advantage of the presently disclosed embodiment in providing positive two-way drives without free-wheeling in any ratio, it will be further appreciated that there is no offsetting disadvantage of vehicle lurch when slowing to a stop with a closed throttle, inasmuch as no change speed shift to underdrive can occur until the time at which the throttle pedal 34 is again depressed, presumably after. The ease and convenience is apparent with the use of a simple flip type manual switch SW2 on the instrument panel 112 for cutting out the direct drive when such operation is not desired.

The foregoing advantages are directly attributable to the novel arrangement of the three series connected switches SW1, SW2 and SW5, and the novel parallel connected switches SW4 and SW3 of which the former is automatically controlled by governor mechanism at governor cut-in and cutout predetermined speeds and of which the latter is controlled by the driver operable accelerator pedal mechanism 120. The parallel switches SW4 and SW3 each have the same effect on the relay winding 108 and the balance of the control circuit.

As herein disclosed the present control invention is shown embodied with a two-speed drive system which mechanically employs an underdrive for the low ratio speed and a direct drive for the higher (1:1) ratio speed. It is evident that with a minor reversal of parts and with an opposite direction of drive of the mechanism direct power paths, the system may be made to operate in 1:1 ratio for lower speed and to operate as an actual overdrive for the higher ratio speed. So as the drawing shows an electrically actuated system combined with a hydraulic shifting system but self-evidently an all electrical, an all hydraulic, or conceivably an all pneumatic system of known servo capacity can be similarly advantageously employed or else various combinations thereof employed as desired.

Variations within the spirit and scope of the invention described are equally comprehended by the foregoing description.

What is claimed is:

1. In a motor vehicle having a passenger compartment provided with accelerator pedal and panel elements and having a governor provided with a speed sensing element, control means for a member operable to establish two driving speed ratios in a power transmission mechanism comprising an electromagnetic circuit including a relay and a solenoid, actuator means for said member responsive to said solenoid, a pair of switches in the circuit manually operable at the panel element in the passenger compartment, a governor operated switch connected to said governor element and operated in correspondence with predetermined vehicle speeds, and first and second switches in the circuit operable by the accelerator pedal element in the passenger compartment, said first switch being included in series with said pair of switches whereby each has the same effect on the circuit, said second switch being arranged in parallel with the governor switch and being operative therewith only as a joint effort to produce an initiating effect on the circuit but being individually operative thereafter to produce the same holding effect on the circuit.

2. In a motor vehicle having a passenger compartment provided with accelerator pedal and panel elements and having a governor provided with a speed sensing element, said accelerator pedal element having opposite kickdown and release positions in the passenger compartment, control means for a member operable to establish two driving speed ratios in a power transmission mechanism comprising an electromagnetic circuit including a relay and a solenoid, actuator means for said member responsive to said solenoid, a pair of switches in the circuit manually operable at the panel element in the passenger compartment, a governor operated switch connected to said governor element and operated in correspondence with predetermined vehicle speeds, and first and second switches in the circuit operable by the accelerator pedal element in its respective kickdown and release positions in the passenger compartment, said first switch being a kickdown effecting switch included in series with said pair of switches whereby each has the same effect on the circuit, said second switch being a release sensitive switch for establishing a faster drive speed ratio, being arranged in parallel with the governor switch and operative therewith only as a joint effort to produce an initial effect on the circuit, but being individually operative to produce the same holding effect on the control circuit.

3. In a motor vehicle transmission having gearing including a rotatable reaction member shiftable into frictional engagement at each of its opposite sides, means including an electrical system for shifting said member comprising electromagnetic means connected to parallel branch resistances in the system, a switch in circuit with each resistance and operable in combination with the other branch to energize said electromagnetic means with either branch being effective thereafter to maintain effective energization of the same, and separate means for operating said switches and effective to open both to de-energize said electromagnetic means, one of said separate means comprising automatic mechanism, another of said separate means comprising driver operable mechanism that also includes an additional switch which in one position thereof is effective to disable said system.

4. In a motor vehicle having a passenger compartment provided with an accelerator pedal element, and having a governor provided with a speed sensing element, control means having a member operable to establish two driving speed ratios in a power transmission mechanism comprising an electromagnetic circuit including a relay and a solenoid for operating said relay, said solenoid requiring a minimum predetermined current to actuate said relay, actuator means for said member operated by said circuit in response to actuation of said relay by said solenoid, a switch in the circuit operable by the accelerator pedal element in the passenger compartment, a governor controlled switch connected to said governor element and operated in accordance with a predetermined vehicle speed, said switches being disposed in parallel branches of said circuit, said switches being individually operative to effect a holding current in said solenoid less than said predetermined minimum current and jointly operative to effect an actuating current in said solenoid as great as or larger than said predetermined minimum current.

5. In a control system, an electromagnetic relay incorporating energizable coil means for electromagnetically actuating the same, a solenoid controlled by the operation of said relay, a source of electrical energy connected to one side of said coil means, parallel branches in the system connected to the opposite side of said coil means with a switch disposed in each of said branches, and each branch having current carrying capacity characteristics relative to said source of energy to be effective while its switch is closed to maintain sufficient field strength in the coil means to hold said relay but not to actuate it initially, and separate means for operating said switches and effective to open them both to de-energize the coil means and deactivate the relay, one of said separate means comprising automatic mechanism, another of said separate means comprising drive operable mechanism.

6. In a control system, an electromagnetic relay incorporating a single winding for actuating the same, a source of electrical energy connected to one side of the winding, a solenoid controlled by the operation of said relay, parallel branches connected to the opposite side of said winding, a switch disposed in each of said branches, and each branch having current carrying capacity characteristics relative to said source of energy to be effective while the switch is closed to maintain sufficient field strength in the winding to hold said relay but not to actuate it initially, and separate means for operating said switches and effective to open them both to de-energize the winding and deactivate the solenoid operating relay.

References Cited in the file of this patent

UNITED STATES PATENTS

| | | |
|---|---|---|
| 2,306,865 | Claytor | Dec. 29, 1942 |
| 2,562,612 | Halberg | July 31, 1951 |
| 2,579,693 | Orr | Dec. 25, 1951 |
| 2,616,304 | Long | Nov. 4, 1952 |
| 2,663,199 | Harrison | Dec. 22, 1952 |
| 2,675,102 | Robinson | Apr. 3, 1954 |
| 2,682,177 | Kelbel | June 29, 1954 |